United States Patent [19]
Siden

[11] 3,747,121
[45] July 17, 1973

[54] DISPOSABLE CAPILLARY-RESERVOIR PEN FOR GRAPHICAL RECORDER

[76] Inventor: Terry C. Siden, 708 Park Pl., Apt. 4, Escondido, Calif. 92025

[22] Filed: June 7, 1971

[21] Appl. No.: 150,468

[52] U.S. Cl. .................. 346/140, 401/192, 401/240
[51] Int. Cl. ........................................... G01d 15/16
[58] Field of Search .................... 346/140; 401/192, 401/260, 228, 292, 240

[56] References Cited
UNITED STATES PATENTS
2,678,633   5/1954   Holden et al. ..................... 401/192
3,120,214   2/1964   Stegenga ............................. 346/140
3,482,257   12/1969  Bowditch et al. ................... 346/140
3,140,912   7/1964   Davis et al. ......................... 346/140

Primary Examiner—Joseph W. Hartary
Attorney—Stephen P. Fox

[57] ABSTRACT

The pen for a graphical recorder contains ink in a sinuous capillary path having a predetermined hydraulic diameter. One embodiment of the pen includes priming means integral therewith.

3 Claims, 7 Drawing Figures

PATENTED JUL 17 1973　　　　　　　　3,747,121
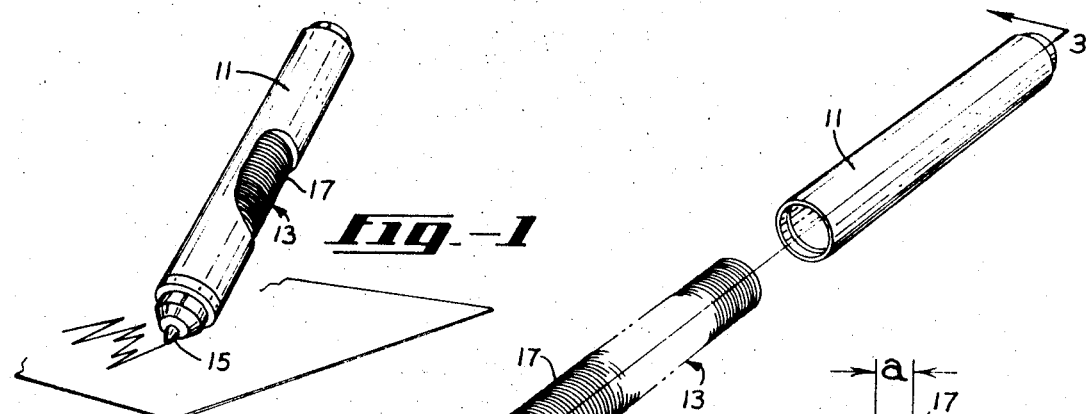
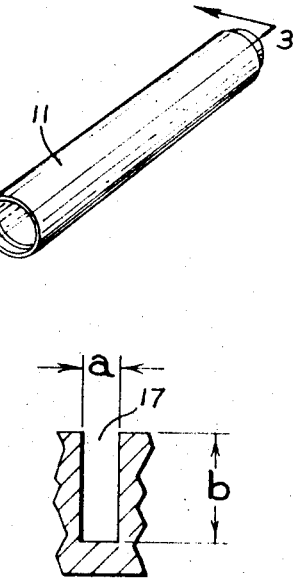
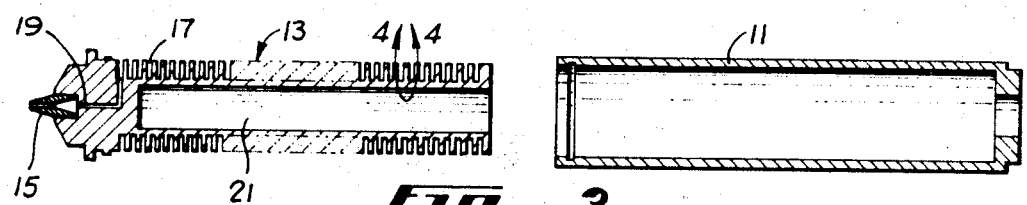
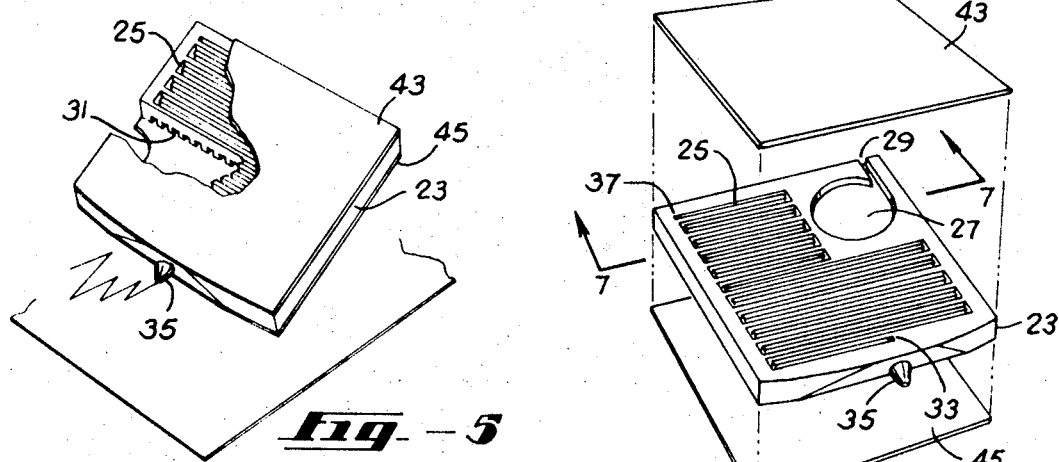
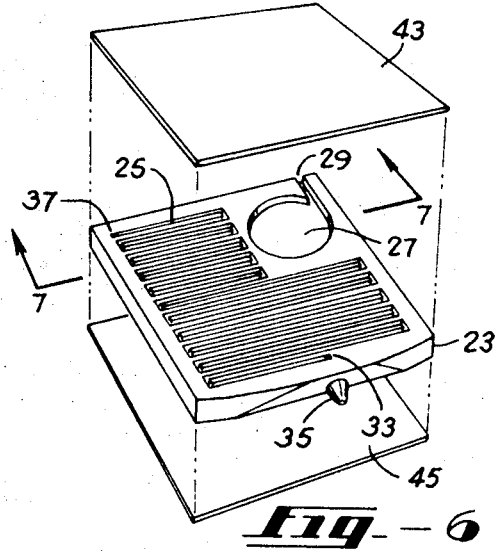
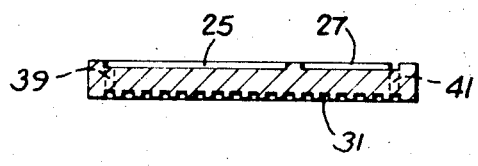
INVENTOR.
TERRY C. SIDEN
BY
Stephen P. Fox
ATTORNEY

DISPOSABLE CAPILLARY-RESERVOIR PEN FOR GRAPHICAL RECORDER

BACKGROUND OF THE INVENTION

One type of pen used in a graphical recorder such as an X-Y plotter includes a plastic housing having a pen tip on one end and containing a latex sack or bladder filled with ink. This type of pen has several disadvantages. For example, the pen is highly susceptible to leaking with changes in atmospheric temperature and pressure. When the pen is first used, or when it is used after a long idle period, it is generally required to use external devices, such as a lever actuated mechanism for compressing the ink sack to prime the pen to force ink through the pen tip. The pen cannot be refilled without disassembling it. This is a time consuming operation, since such pens usually comprise on the order of six different pieces and require approximately 20 assembly steps. Finally, the level of ink remaining in the pen is usually undetectible until the pen ceases to write in use.

SUMMARY OF THE INVENTION

The present invention is a pen having features which obviate the disadvantages described above. The illustrated embodiment of the invention is a transparent plastic structure which is configured to define a convolute capillary fluid passageway for containing an ink supply. One end of the passageway is coupled to a pen tip while the other end is exposed to the atmosphere. The capillary passageway has predetermined physical parameters which optimize writing speed and ink drying time. The pen includes a minimum number of parts and is easily assembled to form an integral plastic block. One embodiment of the pen includes a deformable cavity integral with the pen block and in communication with the capillary passageway. The cavity when manually deformed operates to prime the pen to force ink to flow out of the pen tip.

The advantages of the pen of the present invention are that it does not leak with changes in atmospheric temperature and pressure; it requires no external devices for priming; it can be easily refilled without disassembling; it is formed of a minimum number of pieces and may be assembled using a minimum number of steps; and it provides an easily visible level of the ink supply. In addition, the pen of the present invention provides a higher writing speed capability than heretofore known pens of comparable size.

BRIEF DESCRIPTION OF THE DRAWINGS

FIG. 1 is a perspective view of one embodiment of the pen of the present invention.

FIG. 2 is an exploded perspective view of the pen illustrated in FIG. 1.

FIG. 3 is a cross-sectional view of the pen taken along line 3—3 of FIG. 2.

FIG. 4 is a cross-sectional view of the capillary passageway taken at the section 4—4 in FIG. 3.

FIG. 5 is a partially cutaway perspective view of a second embodiment of the pen of the present invention.

FIG. 6 is an exploded perspective view of the pen illustrated in FIG. 5.

FIG. 7 is a cross-sectional view of the pen taken along the line 7—7 in FIG. 6.

DESCRIPTION OF THE PREFERRED EMBODIMENTS

Referring now to FIGS. 1–4, there is shown one embodiment of the pen. A cylindrical outer sleeve 11 surrounds a cylindrical core 13. The core 13 includes a writing tip 15 integral therewith at one end and a square-thread, screw-like channel 17 on the external lateral surface thereof. The sleeve 11 is dimensioned to be pressed over the core 13 and form a tight fit therewith, thereby to close the open side of the screw-like channel 17 to form a continuous capillary passageway. As viewed in FIG. 3, the right-hand end of this passageway is vented to the atmosphere, and the left-hand end is coupled through a conduit 19 to the pen tip 15 which is press-fitted into a bore in the end of core 13.

Both the core 13 and sleeve 11 are preferably formed of transparent plastic by an injection molding process. Core 13 has a central hollow portion 21 therein to reduce the bulk of the plastic material. This configuration minimizes internal stresses which might warp the core. The sleeve 11 is formed of transparent plastic to permit viewing of the ink supply.

The capillary serves as an ink reservoir and is filled by immersing one end thereof into an ink bath and drawing a vacuum at the other end. When the capillary is properly filled with ink so that no air bubbles are trapped therein, the capillary passageway is both temperature and pressure stabilized, i.e., it will not leak with changes in atmosphere pressure or ambient temperature. Leaking due to gravitational or inertial forces is prevented by the adhesion of ink to the capillary walls and the surface tension of the ink-air interface at the pen tip.

When the pen is in contact with a sheet of paper, the force required to draw the ink from the capillary is derived from the capillary attraction forces between the ink and the paper cells contacted by the writing tip 15. It has been found that the maximum velocity at which the pen will write and the volume of ink deposited on the paper is highly dependent on certain physical parameters of the pen. When the capillary forces are balanced against gravitational forces, the following mathematical expression is obtained:

$$4 S_t \cos \theta = (\sigma g h D_t D_H)/(D_t + D_H)$$

where $S_t$ is the surface tension of the ink-air film interface inside the capillary; $\theta$ is the angle between the internal side wall of the capillary and a line tangent to the meniscus of the ink at the contact point of the ink and the side wall; $\sigma$ is the mass density of the ink; $g$ is the acceleration due to gravity; $h$ is height of the fluid column (i.e., the effective fluid head); $D_t$ is the diameter of the pen tip opening; and $D_H$ is the hydraulic diameter of the capillary, which in turn is given by the expression $D_H = (2ab)/(a+b)$ where $a$ and $b$ are the dimensions shown in FIG. 4.

The pen parameters may be determined by first selecting the type of material from which the capillary walls are formed as well as type of pen tip and ink to be used. This will fix the values of $S_t$, $\sigma$ and $D_t$, and will permit a close approximation of the value of $\theta$. The ink type and capillary wall material should be chosen so that $\theta$ is between 0° and 90° i.e., so that the meniscus is concave. The value of $g$ is a known constant. Thus, the remaining terms $h$ and $D_H$ may be selected to satisfy the above expression. Satisfactory operation of the pen has been achieved with a capillary formed of a polycarbonate plastic material, and using a commercially available ink, such as that supplied by Graphic Controls Corporation, Cherry Hill, N.J., under Part No. 81-2-5-0291-01. In this case, the effective head, $h$, was 1.67 inches, the pen tip diameter $D_t$ was 0.008 inch and the hydraulic diameter $D_H$ was 0.025 inch, the latter of which was obtained using the cross-sectional dimensions of $a = 0.017$ inch and $b = 0.050$ inch as shown in FIG. 4.

FIGS. 5-7 illustrate another embodiment of the pen. A rectangular-shaped pen body 23 is formed of transparent plastic by an injection molding process, for example. One side of the block defines a rectangularly aligned convolute channel 25 and a shallow cavity 27 connected by a channel 29 to the edge of the body 23. The other side of body 23 defines a convolute channel 31 which is rectangularly aligned with the axes of the longer portions of the channel perpendicular to those of channel 25. Channel 25 has one end 33 coupled through a conduit (not shown) in body member 23 to a pen tip 35 and the other end 37 coupled by a conduit 39 through body member 23 (see FIG. 7) to one end of channel 31. The other end of channel 31 is coupled by a conduit 41 through body member 23 to the shallow cavity 27.

Two sheets of transparent plastic 43, 45 are ultrasonically welded on opposite sides of the plastic body 23, thereby closing the convolute channels 25, 31 and the cavity 27. The capillary passageway thus formed is continuous and extends from the pen tip 35 through the entire length of convolute channel 25 on one side of body 23, then through the entire length of convolute channel 31 on the other side of body 23 to the cavity 27 which is vented to the atmosphere through the short channel 29. This long capillary passageway is filled with ink and serves as an ink reservoir as described above.

The shallow cavity 27 on one side of body 23 serves as an internal priming device. When the portion of the plastic sheet 43 covering this cavity is manually depressed at the same time that the vent conduit 29 is covered by the operator's finger, air pressure is created at one end of the capillary passageway. Instead of manually closing the vent, a one way valve (not shown) may be disposed in the vent conduit 29 to permit the entry but not the exit of air therethrough. In either case, depression of the plastic sheet over cavity 27 will force ink to flow out of the pen tip, thus priming the pen for initial use or for additional use after a period of inactivity.

I claim:

1. A compact, disposable writing unit for a graphical recorder comprising:
   reservoir means defining a convolute capillary fluid passageway for containing an ink supply, said passageway having first and second ends, said first end being open to the atmosphere;
   a pen tip coupled in fluid communication with the second end of said passageway;
   said convolute capillary passageway of said reservoir means being formed from a plastic block and including:
      a first portion disposed in a first plane, one end of said first portion being said first end open to the atmosphere;
      a second portion disposed in a second plane parallel and adjacent to said first plane, one end of said second portion being said second end to which said pen tip is coupled; and
      means for coupling said first and second portions in fluid communication to provide a single continuous fluid path between said first open end and said pen tip; and
   means for priming the writing unit to force ink to flow out of said pen tip, said priming means including a manually deformable cavity having a single inlet-outlet conduit coupled to said first open end of said capillary passageway, whereby said first open end may be closed and said cavity compressed to force air under pressure into said capillary passageway, thereby to drive ink in said capillary passageway through said pen tip.

2. The device of claim 1, wherein said reservoir means is formed of optically transparent material, thereby to permit viewing of the ink supply.

3. The device of claim 1, wherein said deformable cavity is an integral part of said reservoir means defining said first and second portions of said convolute capillary passageway.

* * * * *

UNITED STATES PATENT AND TRADEMARK OFFICE
CERTIFICATE OF CORRECTION

PATENT NO. : 3,747,121

DATED : July 17, 1973

INVENTOR(S) : Terry C. Siden

It is certified that error appears in the above-identified patent and that said Letters Patent are hereby corrected as shown below:

```
     Column 1, of the title page, after
"[76] Inventor:  Terry C. Siden, 708 Park Pl., Apt. 4,
                 Escondido, Calif. 92025" insert
-- Assignee:  Hewlett-Packard Company, Palo Alto, Calif. --.
```

Signed and Sealed this sixteenth Day of March 1976

[SEAL]

Attest:

RUTH C. MASON
*Attesting Officer*

C. MARSHALL DANN
*Commissioner of Patents and Trademarks*